United States Patent [19]
Müller et al.

[11] Patent Number: 4,505,369
[45] Date of Patent: Mar. 19, 1985

[54] CLUTCH THRUST BEARING

[75] Inventors: Leo Müller, Essleben; Walter Köder, Schweinfurt; Manfred Brandenstein, Eussenheim; Lothar Walter, Schweinfurt; Ludwig Edelmann, Premich; Roland Bonengel, Geldersheim; Roland Haas, Lendershausen, all of Fed. Rep. of Germany

[73] Assignee: SKF Kugellagerfabriken GmbH, Schweinfurt, Fed. Rep. of Germany

[21] Appl. No.: 371,495

[22] Filed: Apr. 23, 1982

[30] Foreign Application Priority Data

Apr. 23, 1981 [DE] Fed. Rep. of Germany ....... 3116177

[51] Int. Cl.³ ............................................. F16D 23/14
[52] U.S. Cl. ................................. 192/98; 192/110 B; 308/DIG. 4
[58] Field of Search ............... 192/98, 110 B; 308/235, 308/DIG. 4

[56] References Cited

U.S. PATENT DOCUMENTS

| | | | |
|---|---|---|---|
| 3,815,715 | 6/1974 | Maucher | 192/98 |
| 3,900,091 | 8/1975 | Maucher | 192/98 |
| 4,271,950 | 6/1981 | Kolb | 192/98 |
| 4,374,556 | 2/1983 | Olschewski et al. | 192/98 |

FOREIGN PATENT DOCUMENTS 1126058 9/1968 United Kingdom .

Primary Examiner—Rodney H. Bonck
Attorney, Agent, or Firm—Yuter, Rosen & Dainow

[57] ABSTRACT

In a clutch throwout, particularly for automotive clutches, a self-centering clutch bearing is arranged on or in a sliding sleeve. The stationary bearing ring of the clutch bearing is connected with the sliding sleeve via an intermediate element, which features guides for the radial sliding, in two mutually crossing radial directions, of the clutch bearing in relation to the sliding sleeve.

To enable the clutch bearing to slide in any radial direction and to position itself precisely centered in relation to the tongue ends of the clutch diaphragm spring, without great constraining forces, while, regardless of position, damping the relative movements of clutch bearing in relation to sliding sleeve, intermediate element is radially interlocked with the stationary bearing ring and with the sliding sleeve, in two mutually crossing directions.

13 Claims, 22 Drawing Figures

CLUTCH THRUST BEARING

BACKGROUND OF THE INVENTION

The present invention relates generally to a clutch thrust bearing or a clutch throwout, and particularly to a clutch throwout for automotive clutches, in which a self-centering clutch bearing is arranged on or in a sliding sleeve and in which the stationary bearing ring of the clutch bearing is connected via an intermediate element with the sliding sleeve. The intermediate element is provided with guides for radial sliding, in two mutually crossing directions, of the clutch bearing in relation to the sliding sleeve.

There is already known, in U.K. Pat. No. 1,126,058, a clutch bearing that is self-centering during disengagement, and in which there is provided a spring which acts on the stationary bearing ring in the axial direction of the bearing support. This known design has the disadvantage that the axially acting spring causes very pronounced damping of the radial movement of the bearing, thus materially hampering the self-centering of the clutch bearing and only permitting it after several clutch disengagements.

Furthermore, as shown in U.S. Pat. No. 3,815,715, it is known to secure a clutch bearing, spring-loaded in an axial direction, against rotation in relation to the sliding sleeve, by positive locking. As a result, there is provided an intermediate element with two guides arranged crosswise to one another, which act in conjunction with the stationary bearing ring and the sliding sleeve. This known clutch throwout has the disadvantage that separate elements are required to secure the stationary bearing ring against rotation and to axially position the bearing against the thrust flange of the sliding sleeve, thereby hampering self-centering action of the clutch bearing.

The object of the present invention is to provide an improved cluth throwout of above-mentioned type in a manner such that large radial motions of the clutch bearing can be damped without materially inhibiting the self-centering process.

It is a further object of the present invention to provide an improved self-centering bearing wherein the number of parts is reduced and the assembly of the clutch throwout is simplified.

BRIEF DESCRIPTION OF THE INVENTION

The foregoing objects are achieved in accordance with the present invention in a clutch throwout construction wherein an intermediate element is radially interlocked with the stationary bearing ring and with the sliding sleeve, in two mutually crossing directions.

In accordance with the construction of two mutually crossing guides and the radial interlocking of the intermediate element with the stationary bearing ring and the sliding sleeve, the clutch bearing can slide in every radial direction and can precisely position itself centrally to the tongue ends of the clutch diaphragm spring, without great constraining forces, the relative motions of the clutch bearing in relation to the sliding sleeve being damped in every position.

In addition, the invention includes an opening with two guide surfaces that run parallel to one another in the stationary bearing ring. Between these surfaces there is arranged a polygonal spring lock washer provided with two sections that are perpendicular to one another and arranged in pairwise parallel fashion. The outer surfaces of one pair of sections abut under radial prestress against the guide surfaces of the opening, and the inner surfaces of the other air of sections abut under radial prestress against the cylindrical surface of the sliding sleeve.

In accordance with a further advantageous development of the invention, a disc made of an elastic material is arranged axially between the thrust flange of the sliding sleeve and the stationary bearing ring. The disc includes an opening with two diametrically opposed recesses with guide surfaces that run parallel to one another. Against the guide surfaces, under prestress, abut axially oriented projections connected to the stationary bearing ring. In the opening of the disc there are provided two other parallel guide surfaces which are arranged with a 90° shift relative to the first guide surfaces and which abut under prestress against the cylindrical surface of the sliding sleeve. By thus designing the intermediate element as a disc with appropriate guide surfaces, this part can be manufactured in one piece, by casting or injection molding, without the need for further processing steps. Due to the properties of the disc material, the disc also contributes to damping noise and vibrations.

The intermediate element alternatively comprises a disc with four elastic lugs angled in an axial direction, arranged two by two in parallel to one another and formed on different sides of the disc. The lugs, offset by 90°, abut under prestress on one side with their guide surfaces against corresponding surfaces of the thrust flange and on the other side against corresponding surfaces of the stationary bearing ring.

As a result of the foregoing design there is created an intermediate element of low-cost manufacture, and permitting simple assembly of the clutch throwout.

DESCRIPTION OF THE DRAWINGS

The foregoing objects and brief description of the invention will become more apparent from the following more detailed description and appended drawings, wherein.

DETAILED DESCRIPTION OF THE INVENTION

Figure 1:
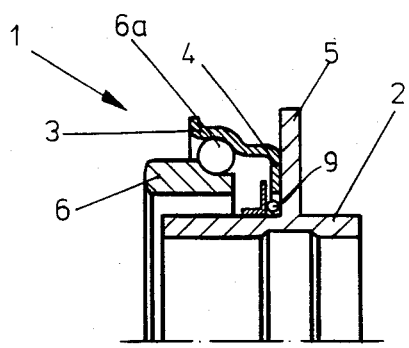
FIG. 1 shows a section A—B of a clutch throwout according to FIG. 3, with a self-centering clutch bearing and a spring lock washer with an O-shaped cross section as the intermediate element.
Figure 2:
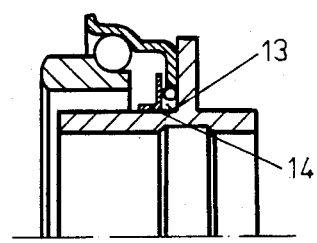
FIG. 2 shows a section C—D of the clutch throwout shown in FIG. 3.
Figure 3:
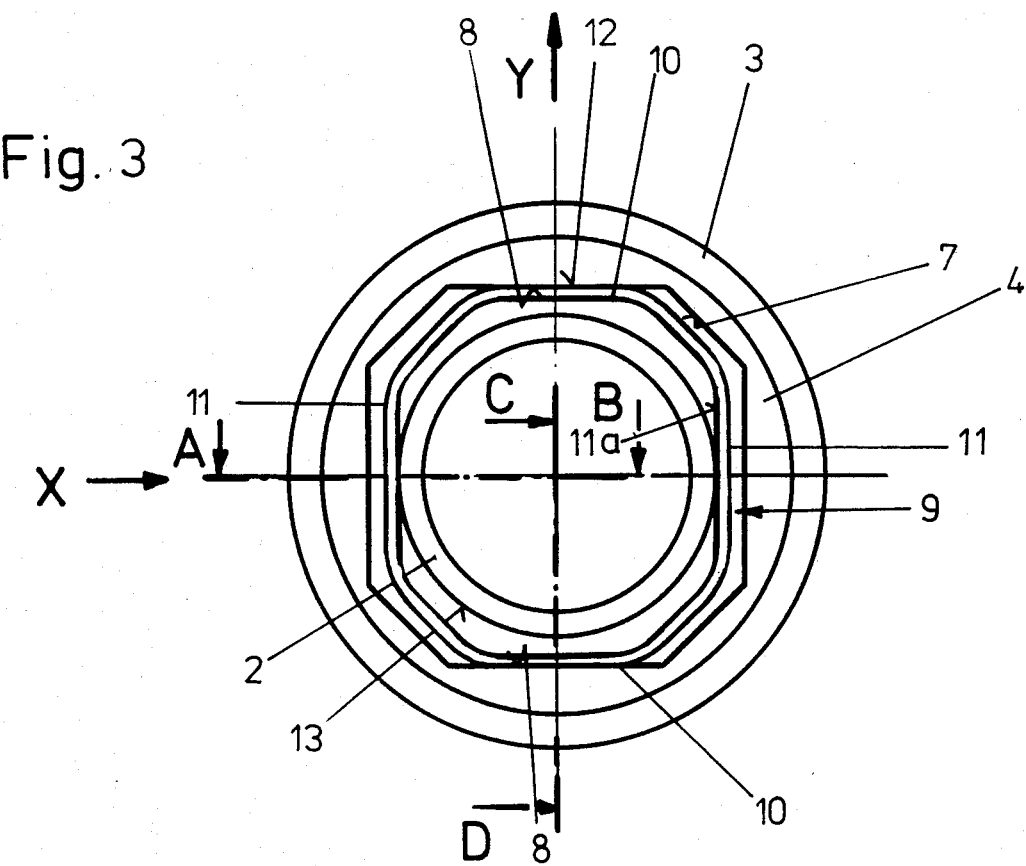
FIG. 3, shows a lateral view of the clutch throwout shown in FIGS. 1 and 2, without complement of balls and inner ring, from the left.

FIGS. 1 to 3 illustrate a clutch throwout with a self-centering clutch bearing 1, arranged with radial clearance on a sliding sleeve 2. Clutch bearing 1 consists of a stationary outer ring 3, made of sheet metal, which abuts with an inwardly oriented flange 4 against thrust flange 5. The flange 5 is solidly connected with sliding sleeve 2. The bearing 1 also includes a massive rotating inner ring 6 and balls 6a. Outer ring 3 features an opening 7 in flange 4, with two guide surfaces 8 that run parallel to one another. Between the guide surfaces, a polygonally shaped spring lock washer 9 is inserted with radial prestress. Spring lock washer 9, designed with an polygonal cross-section, possesses two pairs of mutually parallel sections 10 and 11, arranged with a 90° shift in relation to each other. Outer surfaces 12 of the parallel sections 10 abut with radial prestress against the guide surfaces 8 of opening 7. Inner surfaces 11a of parallel sections 11 have an opening between each other which is normally smaller than the diameter of sliding sleeve 2. It is thus possible, after overcoming a spring load, to slide stationary bearing ring 3 on surfaces 12 of spring lock washer 9 in a radial plane X, and to slide outer ring 3 with spring lock washer 9 in a 90°-shifted radial plane Y on the cylindrical surface 13 of sliding sleeve 2. This arrangement and design of spring lock washer 9 achieves a vibration-damping radial adjustability of clutch bearing 1 in all directions, where the radial position of clutch bearing 1, attained as a result of the offset in the axis, is levelly maintained with little or no axial preload. The axial fixation of clutch bearing 1 on sliding sleeve 2 is effected by means of an angle ring 14.

Figure 4:
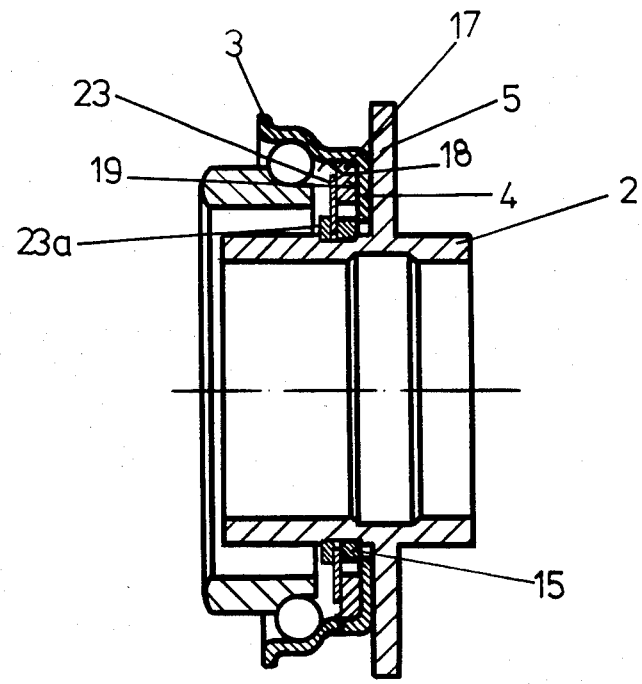
FIG. 4, shows a modified design embodying a clutch throwout according to the invention, in section, with a polygonal spring lock washer with a rectangular cross section.
Figure 5:
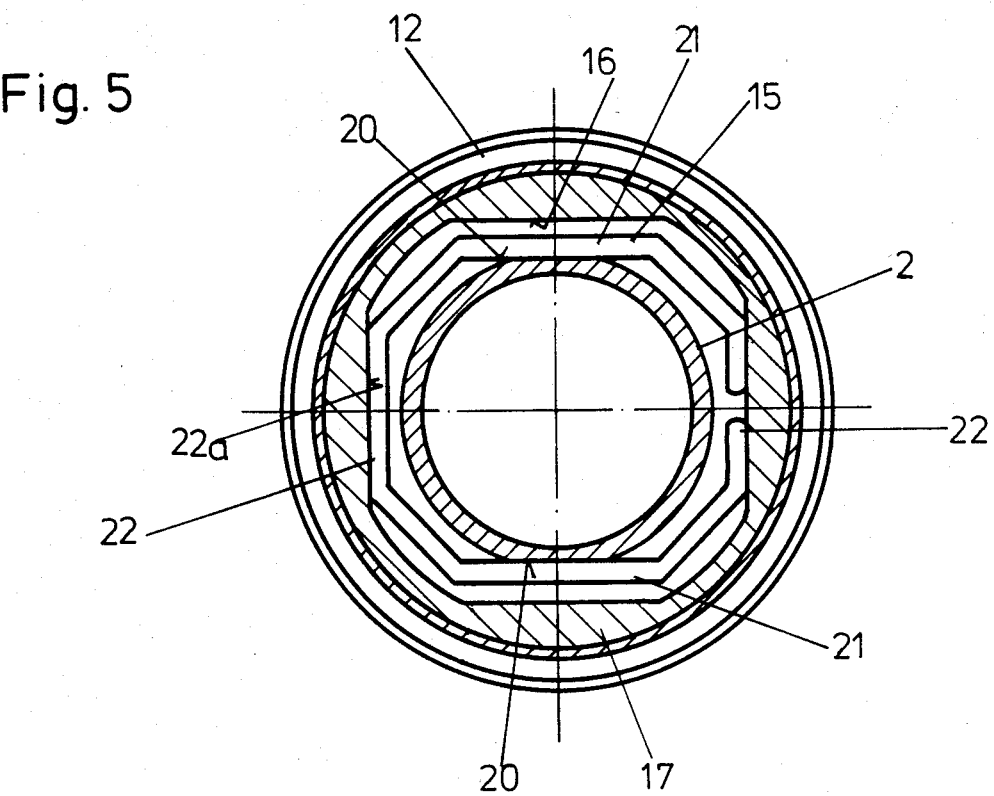
FIG. 5 shows a radial section of the clutch throwout shown in FIG. 4.

The example of embodiment shown in FIGS. 4 and 5 follows the same principle as the construction shown in FIGS. 1 to 3. The difference consists solely in the fact that the polygonal spring lock washer 15 features a square cross section and is arranged in the opening 16 of a disc 17, which may be made of plastic material. The disc 17 is inserted in bore 18 of outer ring 3 and abuts against the inner surface 19 of flange 4. Furthermore, sliding sleeve 2 includes a flat 20 in the area of spring lock washer 15, against which the parallel-running sections 21 of polygonal spring lock washer 15 abuts with radial prestress. Sections 22 of spring lock washer 15 are arranged against guide surfaces 22a of disc 17. Disc 17 with clutch bearing 1 is secured on sliding sleeve 2 by a thin disc 23 which is fastened by means of a snap ring 23a.

Figure 6:
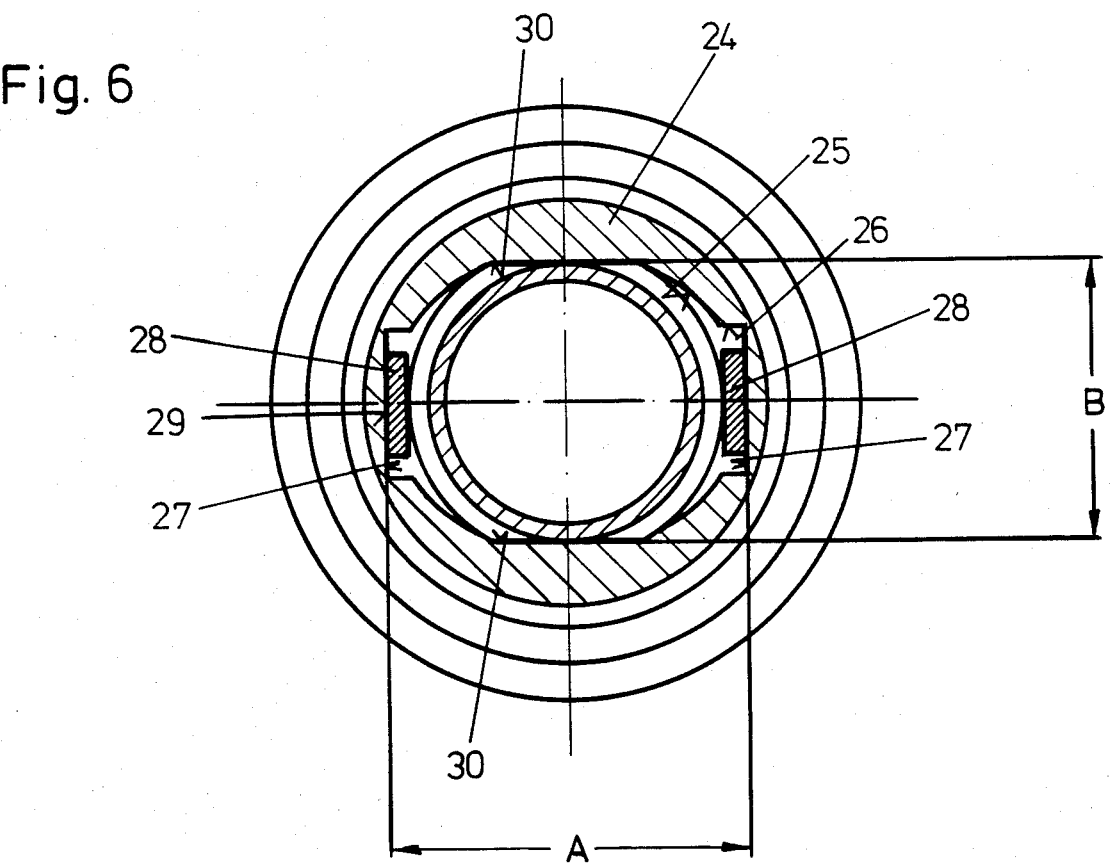
FIG. 6 shows a section E—F of the clutch throwout shown in FIG. 7, in which a disc is provided in lieu of the spring lock washer.
Figure 7:
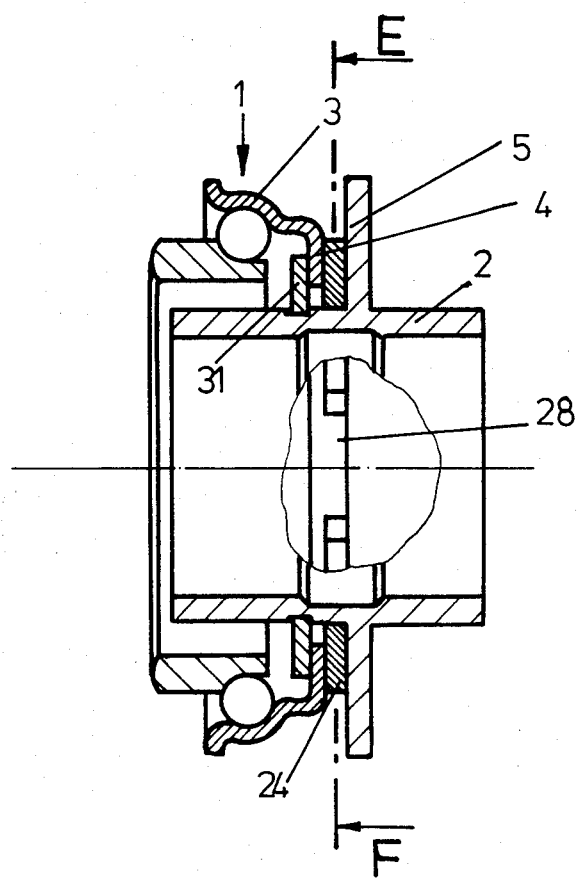
FIG. 7 shows an axial section through a clutch throwout according to FIG. 6.

FIGS. 6 and 7 show a modified embodiment of the clutch throwout according to the invention. Instead of polygonal spring lock washer 9 there is a disc 24, which may be made of plastic material, arranged axially between stationary bearing ring 3 and thrust flange 5 of sliding sleeve 2. As can be seen in FIG. 6, disc 24 features an opening 25 with two diametrically opposed recesses 26, whose guide surfaces 27 run parallel to each other. Against these guide surfaces 27 abut axially oriented projections 28, integrally connected with stationary bearing ring 3. When not inserted, distance A between guide surfaces 27 of recesses 26 is smaller than the distance between surfaces 29 (which face in mutually opposing directions) of projections 28, so that disc 24 is arranged under prestress on projections 28. In opening 25 of disc 24 there are furthermore provided two parallel surfaces 30 which are arranged with a 90° shift in relation to surfaces 27 and whose distance B when not inserted is smaller than the diameter of the sliding sleeve in this area. This achieves a radial mobility of clutch bearing 1 in relation to disc 24 in a radial direction, and a sliding mobility of clutch bearing 1 with disc 24 in a radial direction shifted by 90°. Overlapping of both motions permits unimpeded radial sliding of clutch bearing 1, so that, in relation to the clutch diaphragm spring (not shown), a centered position is levelly maintained with little or no preload. Clutch bearing 1 and disc 24 are fixed in an axial direction on sliding sleeve 2 by means of a snap ring 31.

Figure 8:
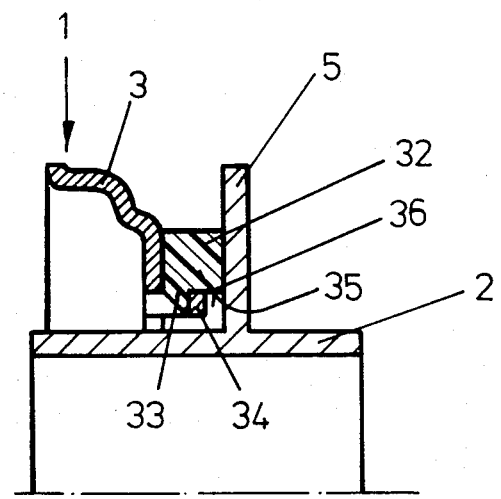
FIG. 8 shows an axial section through a modified design of a clutch throwout according to the invention, without rolling elements and inner ring.
Figure 9:
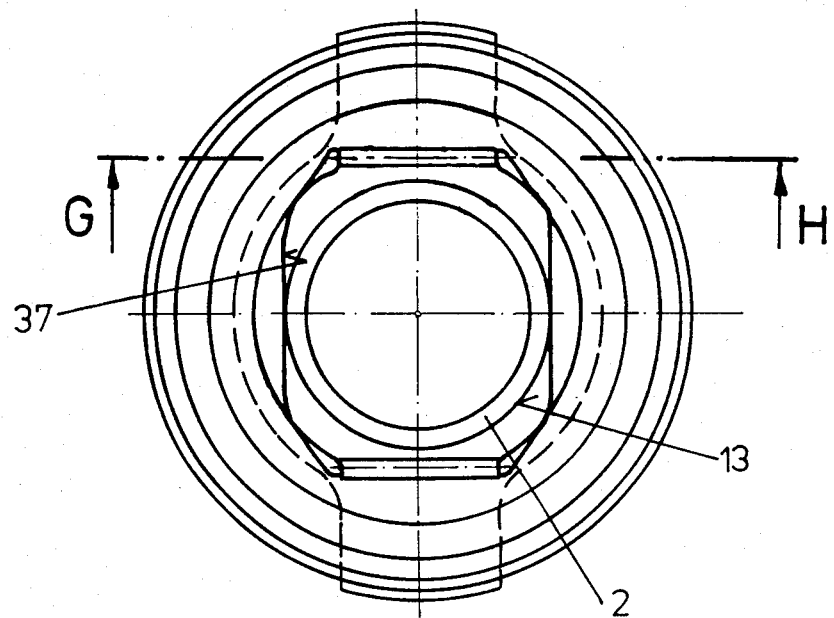
FIG. 9 shows a lateral view of the clutch throwout shown in FIG. 8, from the left.
Figure 10:
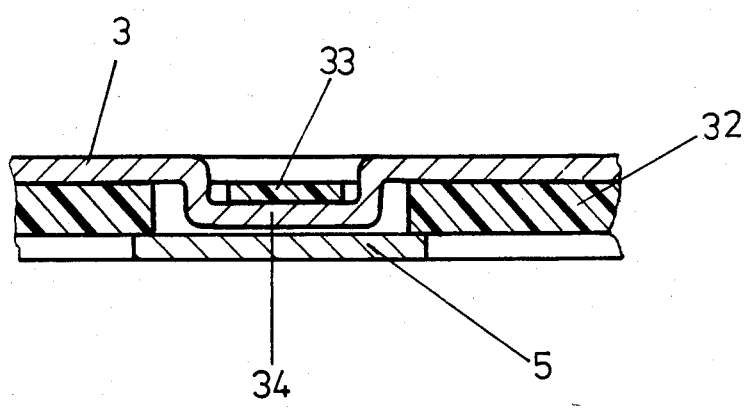
FIG. 10 shows a partial section G—H, according to FIG. 9.

FIGS. 8 to 10 show a modified embodiment. This design is equivalent in all essential respects to the clutch throwout shown in FIGS. 6 and 7. The difference lies in the design of disc 32 and stationary bearing ring 3. Disc 32 is provided with a projection 33, oriented radially inward, that snaps behind a projection 34, formed in an axial direction out of stationary bearing ring 3, in the area of the latter's bore. The disc 32 and clutch bearing 1 thus form a unit. Guide surfaces 35 of disc 32 abut against surfaces 36 of projections 34, while parallel-running guide surfaces 37 of disc 32 work in conjunction with the cylindrical surface 13 of sliding sleeve 2.

Figure 11:
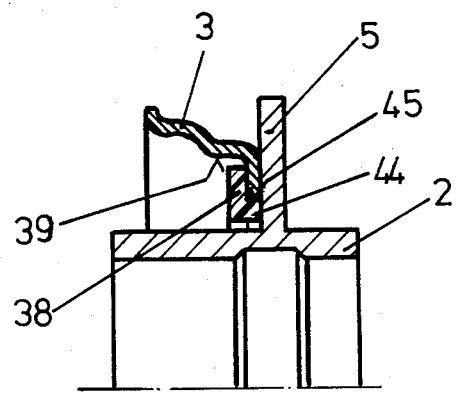
FIG. 11 shows a section I—K of the clutch throwout shown in FIG. 13, in which the disc for the regulation of the radial slide of the clutch bearing is arranged within the stationary bearing ring and the latter abuts against the thrust plate.
Figure 12:
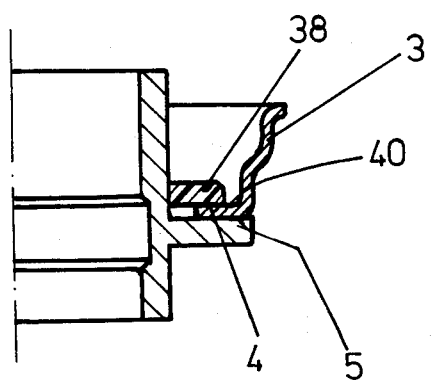
FIG. 12 shows a section L—M of the clutch throwout shown in FIG. 13.
Figure 13:
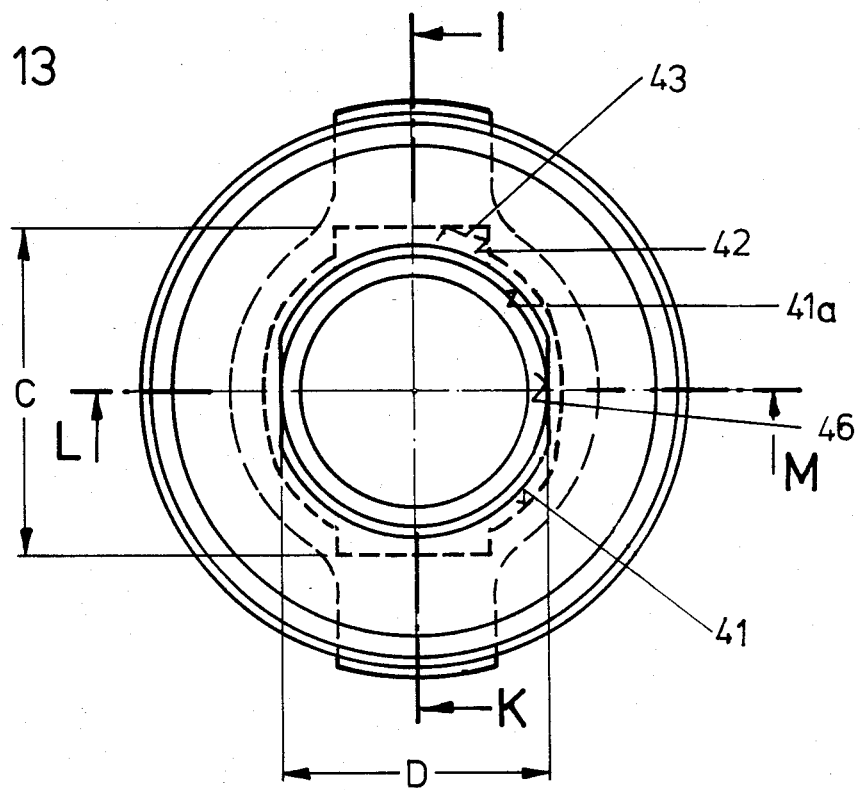
FIG. 13 shows a lateral view of the clutch throwout shown in FIG. 11, from the left.

The design shown in FIGS. 11 to 13 follows, in principle, that of the clutch throwout according to FIGS. 6 and 7. The difference consists in that disc 38 is arranged, for the regulation of the radial sliding capability, not between stationary bearing ring 3 and the thrust flange 5 of sliding sleeve 2, but in bore 39 of stationary bearing ring 3. The disc 38 abuts against inner surface 40 of flange 4. In this design, flange 4 of outer ring 3 features an opening 41 with two diametrically opposed recesses 42 with guide surfaces 43 running parallel to each other, against which abut projections 44 that are connected with disc 38. Distance C between guide surfaces 43 of outer ring 3, when not inserted, is smaller than the distance between surfaces 45 (which face in mutually opposing directions) of projections 44. Opening 41a in disc 38 displays two parallel surfaces 46, arranged at a 90° shift to guide surfaces 43, whose distance D, when not inserted, is smaller than the diameter of sliding sleeve 2 in this area.

Figure 14:
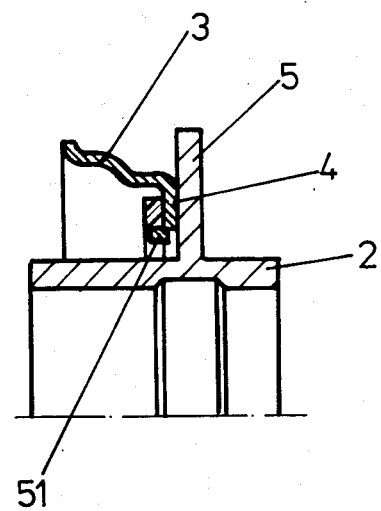
FIG. 14 shows a section P—Q of another design of embodiment of the clutch throwout, shown in FIG. 16, with a projection arranged on the stationary bearing ring, which projection engages into a recess of the disc.
Figure 15:
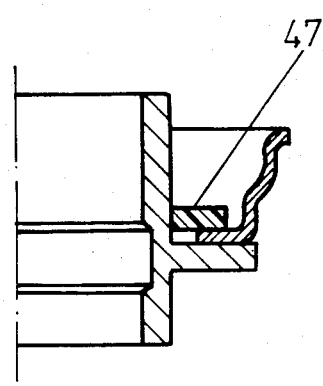
FIG. 15 shows a section N—O of the clutch throwout shown in FIG. 16.
Figure 16:
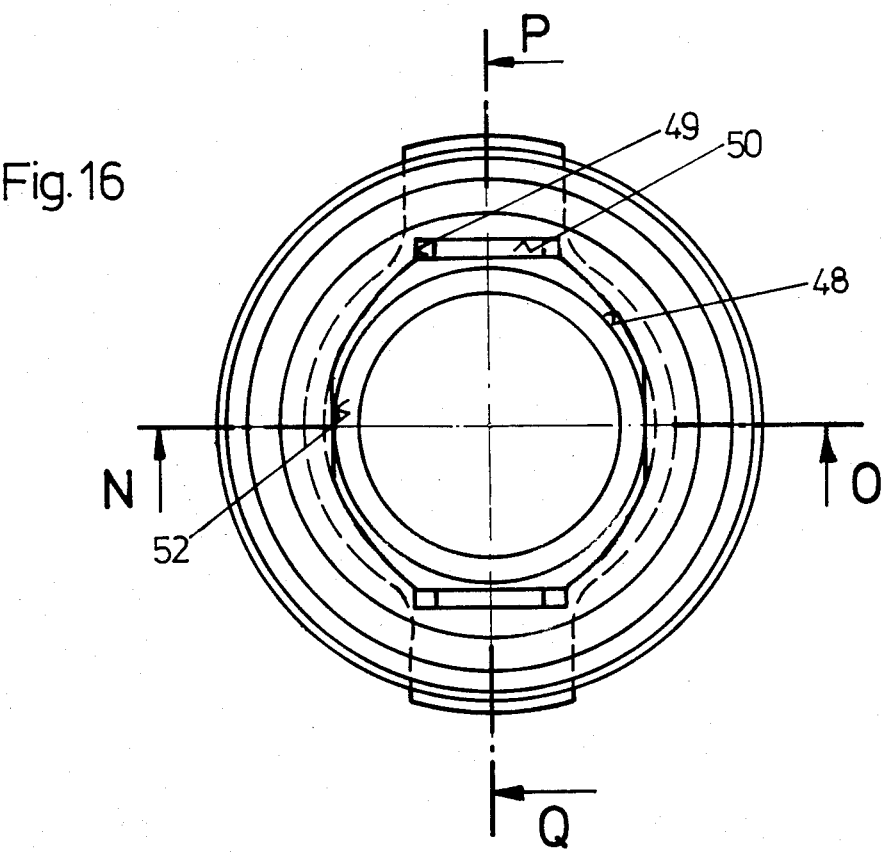
FIG. 16 shows a lateral view of the clutch throwout according to FIG. 14, from the left.

In the clutch throwout illustrated in FIGS. 14 to 16, stationary bearing ring 3 abuts with flange 4 (which is angled radially downward) against thrust flange 5 of sliding sleeve 2. Disc 47 is designed in the same fashion as disc 24 in FIG. 6, having an opening 48 with two diametrically opposed recesses 49 with parallel-running guide surfaces 50. The surfaces 50 are engaged by axially offset projections 51 which are connected to stationary bearing ring 3 in the area of the bore. Opening 48 of disc 47 furthermore features two parallel guide surfaces 52 which are shifted by 90° in relation to surfaces 50 and whose distance from each other, when not inserted, is smaller than the diameter of sliding sleeve 2 in this area.

Figure 17:
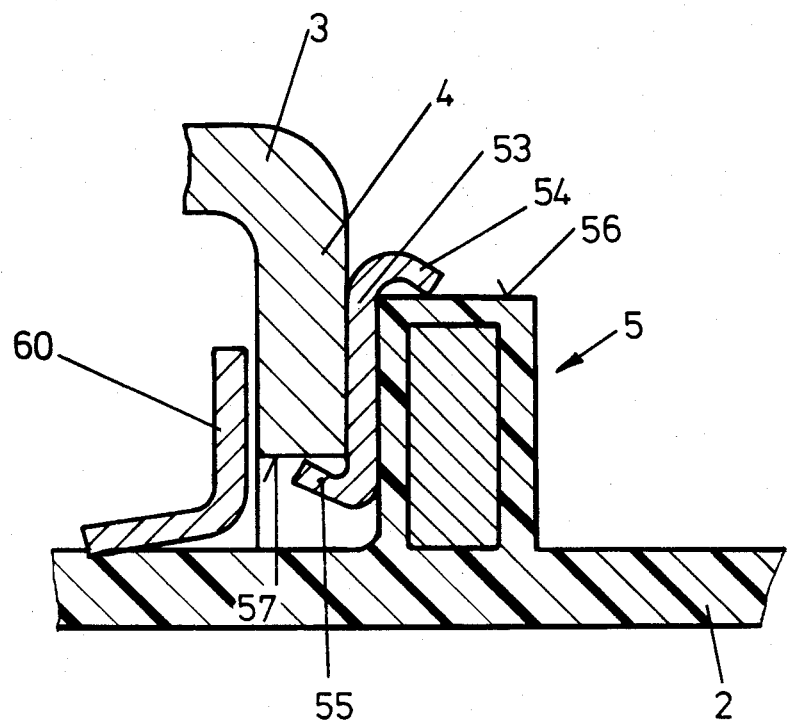
FIG. 17 shows a reaction R—S of the clutch throwout according to FIG. 18, in which the radial slide is controlled by a disc designed with a Z-shaped cross section.
Figure 18:
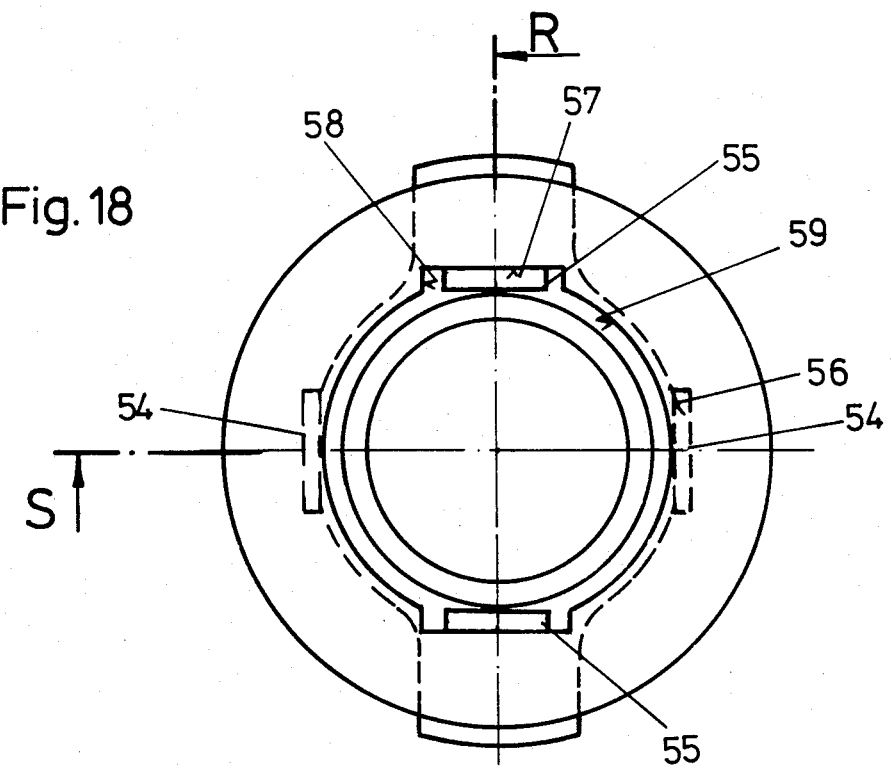
FIG. 18 shows a lateral view of the clutch throwout according to FIG. 17, from the left.

FIGS. 17 and 18 show a modified embodiment of a clutch throwout according to the invention. Between thrust flange 5 of sliding sleeve 2 and radially inwardly angled flange 4 of stationary outer ring 3, there is provided a disc 53 with four lugs 54, 55 angled in an axial direction, which have a radial spring action. The two diametrically opposed lugs 55 are angled toward the clutch bearing, while lugs 54, arranged with a 90° shift, point away from the clutch bearing. Lugs 54 abut with prestress against surfaces 56 that run parallel to each other on the curcumference of thrust flange 5. Lugs 55, on the other hand, are arranged on the mutually parallel oriented guide surfaces 57 of two recesses 58, worked into bore 59 of radially inwardly oriented flange 4. The width of recesses 58 is greater than the width of spring-action lugs 55, so that stationary bearing ring 3 can slide in a radial direction in relation to disc 53. On the other hand, stationary bearing ring 3 can slide together with disc 53, in a radial direction that is shifted by 90°, lugs 54 serving as guides on surfaces 56 of flange 5. With an overlapping of both motions, the clutch bearing can effect any required radial slide, and after centering is fixed in the centered position. Stationary bearing ring 3 with disc 53 is axially secured on sliding sleeve 2 by means of an angle ring 60.

Figure 19:
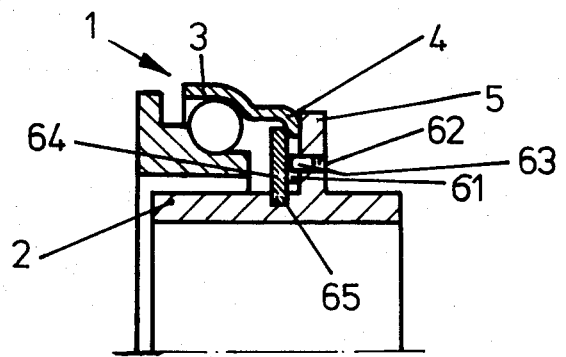
FIG. 19 shows a clutch throwout according to the invention, in section, in which the radial slide of the clutch bearing is regulated by cylindrical pins.
Figure 20:
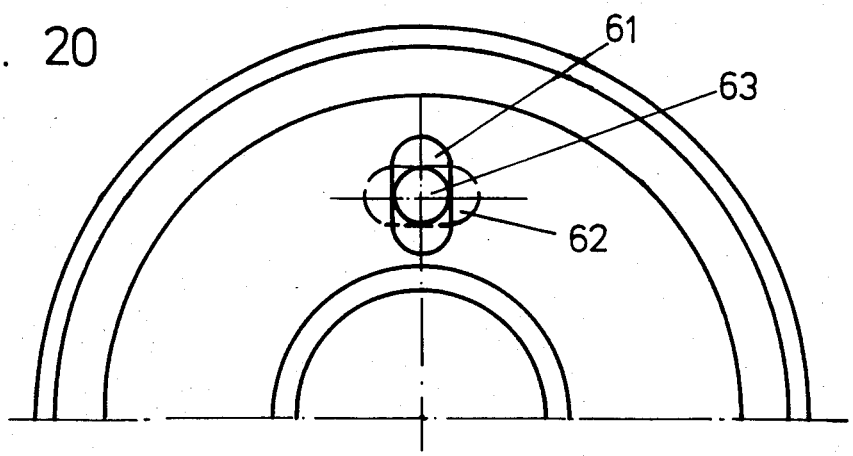
FIG. 20 shows a lateral view of the clutch throwout shown in FIG. 19, without rolling elements and inner ring.

In the clutch throwout illustrated in FIGS. 19 and 20, outer ring 3 abuts with its radially inward-angled flange 4 against thrust flange 5 of sliding sleeve 2. Flange 4 and thrust flange 5 are provided with two diametrically opposed channels 61, 62, arranged crosswise. As a result, for example, channels 61 in stationary bearing ring 3 run vertically and channels 62 in thrust flange 5 run horizontally. In each of channels 61, 62 is inserted a cylindrical pin 63 whose diameter is slightly greater than the width of channels 61, 62. Thus, when clutch bearing 1 slides in a radial direction, a frictional force acting on cylindrical pin 63 maintains bearing 1 in each position. By means of channels 61, 62 that are arranged crosswise, clutch bearing 1 can assume any position that results during centering. If the motion is vertical, only bearing 1 slides. If the motion is horizontal, bearing 1 together with pin 63 moves. The axial fixation of clutch 1 on sliding sleeve 2 is effected by a disc 64 that engages an annular channel 65 on the cylindrical surface of sliding sleeve 2.

Figure 21:
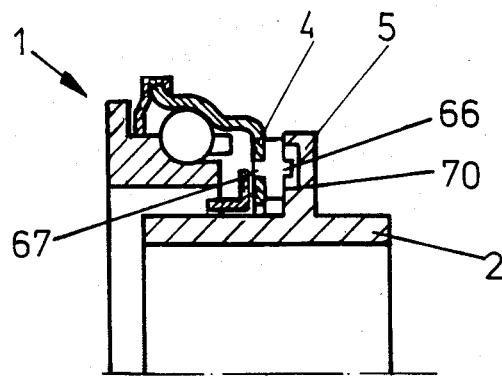
FIG. 21 shows a modified design embodying a clutch throwout according to the invention, with an intermediate element whose molded-on projections engage in channels, arranged crosswise of the stationary bearing ring and of the thrust flange of the sliding sleeve.
Figure 22:
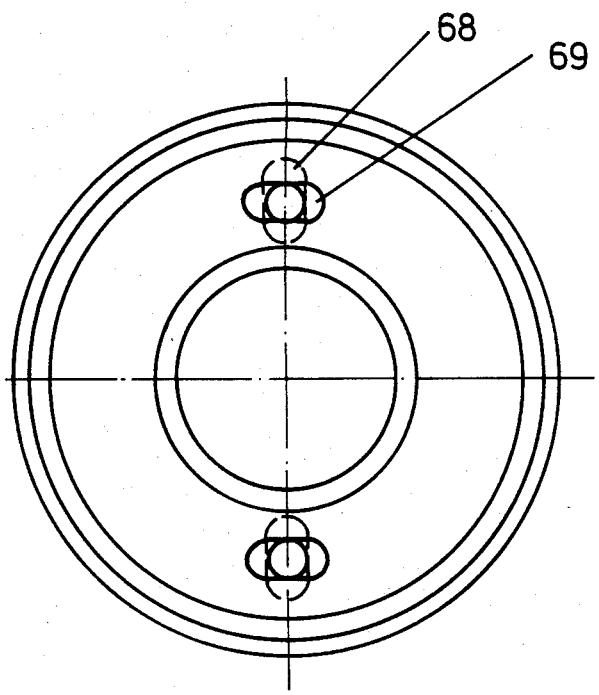
FIG. 22 shows a lateral view of the clutch throwout according to FIG. 21, without rolling elements and inner ring.

The design shown in FIGS. 21 and 22 differs from that shown in FIGS. 19 and 20 in that a disc 70 (which may be made of plastic material) is inserted between flange 4 and thrust flange 5. Appropriate projections 66, 67 of the disc engage with radial prestress in channels 68, 69, arranged crosswise in thrust flange 5 and in flange 4.

The embodiments described represent various examples of a clutch throwout according to the invention. One can easily introduce changes in the design of the individual components, within the framework of the invention. Thus, for instance, the polygonal spring lock washer shown in FIGS. 1 to 3 need not abut against cylindrical surface 13 of sliding sleeve 2, but it can also engage two channels in the cylindrical surface of sliding sleeve 2 that run parallel to the adjacent surfaces of polygonal spring lock washer 9. This permits a simple connection of the clutch bearing with the sliding sleeve, via spring lock washer 9, with a simple fixation of spring lock washer 9 on stationary bearing ring 3, by means of bendable lugs or similar devices. Furthermore, it is also possible to design the angle at which the guides cross for radial sliding of the clutch bearing in relation to the sliding sleeve, as other than a right angle. Other variations and modifications within the spirit and scope of the present invention will be apparent to those skilled in the art.

What is claimed is:

1. A clutch throwout, including a self-centering clutch bearing, a sliding sleeve means, said bearing including a stationary bearing ring connected with said sliding sleeve means via an intermediate element, said intermediate element having guides for allowing said cluth bearing to slide radially in two mutually crossing radially in two mutually crossing radial directions relative to said sliding sleeve means, said intermediate element being radially interlocked with prestress with said stationary bearing ring and said sliding sleeve means in two mutually crossing directions.

2. The clutch throwout of claim 1, wherein said intermediate element is radially interlocked in a first plane, running along the center axis, with said stationary bearing ring and in a second plane, perpendicular to said first plane, with said sliding sleeve means.

3. The clutch throwout of claim 1, wherein said sliding sleeve means includes a thrust flange and wherein a disc is provided between said thrust flange and said stationary bearing ring, said disc including an opening with two diametrically opposed recesses with guide surfaces running parallel to one another, said stationary bearing ring including axially-oriented projections abutting said guide surfaces, where the distance between said guide surfaces when not inserted in said ring is smaller than the distance between opposing surfaces of said projections of said ring, said disc opening further including two further parallel guide surfaces arranged with a 90° shift in relation to said disc guide surfaces the distance between said further guide surfaces when not inserted is smaller than the diameter of said sliding sleeve means.

4. The clutch throwout of claim 3, wherein each disc includes a projection directed radially inward, and which snaps behind the projections which are formed in an axial direction out of said stationary bearing ring.

5. The clutch throwout of claim 1, wherein said stationary bearing ring includes a flange having an opening with two diametrically opposed recesses with guide surfaces running parallel to one another, against which guide surfaces abut projections connected to a disc, where the distance between said guide surfaces of said recesses when not inserted is smaller than the distance between the mutually opposed surfaces of said projections, said disc including an opening having two parallel surfaces arranged with a 90° shift in relation to said guide surfaces, the distance from each other, when not inserted, being smaller than the diameter of said sliding sleeve means.

6. The clutch throwout of claim 1, wherein said stationary bearing ring includes a disc including an opening with two diametrically opposed recesses with guide surfaces that run parallel to one another, against which guide surfaces abut, with radial prestress, projections connected with said stationary bearing ring, said opening of said disc having two parallel guide surfaces arranged with a 90° shift in relation to said guide surfaces and whose distance from each other, when not inserted, is smaller than the diameter of said sliding sleeve means.

7. The clutch throwout of claim 1, wherein said sliding sleeve means includes a thrust flange, said stationary bearing ring includes a flange, said latter flange being angled radially downward, a disc positioned between said flanges and having four radially elastic lugs that are angled in an axial direction, two diametrically opposed lugs facing clutch bearing and abutting, with prestress, against the guide surfaces of two diametrically opposed recesses arranged in the bore of said flange, which guide surfaces run parallel to one another, and two lugs shifted by 90°, facing away from said clutch bearing and abutting, with radial prestress, against the guide surfaces which are arranged parallel to one another on the cylindrical surface of said thrust flange.

8. The clutch throwout of claim 1, wherein said stationary bearing ring includes a flange, and said sliding sleeve means includes a thrust flange, each flange including two diametrically opposed channels arranged crosswise, and in which is inserted, with radial prestress, a cylindrical interlocking pin.

9. The clutch throwout of claim 1, wherein said ring includes a flange and said sleeve means includes a thrust flange, and a disc having projections which engage with radial prestress in channels, arranged crosswise, in said thrust flange and said flange.

10. The clutch throwout of claim 1, wherein said stationary bearing ring includes an opening with two guide surfaces running parallel to one another, said intermediate element comprises a polygonal spring lock washer, arranged between said guide surfaces and provided with a first pair of parallel guides that are perpendicular to a second pair of parallel guides, the outermost portions of said first pair of guides respectively abutting with outwardly directed radial force against said guide surfaces and the innermost portions of said second pair of guides respectively abutting with inwardly directed radial force against said sliding sleeve means.

11. The clutch throwout of claim 10, wherein said sliding sleeve means includes two diametrally opposed channels running parallel in a plane perpendicular to the center axis, said polygonal spring lock washer engaging said channels.

12. A clutch throwout including a self-centering clutch bearing having a stationary bearing ring, a sliding sleeve means, an intermediate element, and a disc inserted in said stationary bearing ring for coupling said intermediate element and said stationary bearing ring, said intermediate element having guides and said disc having an opening with two guide surfaces for allowing said clutch bearing to slide radially in two mutually crossing radial directions relative to said sliding sleeve means, said intermediate element being radially interlocked with prestress with said disc means and said sliding sleeve means in two mutually crossing directions.

13. The clutch throwout of claim 12 wherein said intermediate element comprises a polygonal spring lock washer, arranged between said guide surfaces and provided with a first pair of parallel guides that are perpendicular to a second pair of parallel guides, and said sliding sleeve means includes two diametrally opposed channels running parallel in a plane perpendicular to the center axis, the outermost portions of said first pair of guides respectively abutting with outwardly directed radial force against said guide surfaces and the innermost portions of said second pair of guides respectively engaging said channels with inwardly directed radial force.

* * * * *